(12) United States Patent
Jacobson et al.

(10) Patent No.: US 9,599,634 B2
(45) Date of Patent: Mar. 21, 2017

(54) SYSTEM AND METHOD FOR CALIBRATING INERTIAL MEASUREMENT UNITS

(71) Applicant: Vibrado Technologies, Inc., Sunnyvale, CA (US)

(72) Inventors: Quinn A. Jacobson, Sunnyvale, CA (US); Cynthia Kuo, Mountain View, CA (US)

(73) Assignee: VIBRADO TECHNOLOGIES, INC., Sunnyvale, CA (US)

( * ) Notice: Subject to any disclaimer, the term of this patent is extended or adjusted under 35 U.S.C. 154(b) by 336 days.

(21) Appl. No.: 14/095,809

(22) Filed: Dec. 3, 2013

(65) Prior Publication Data

US 2014/0150521 A1     Jun. 5, 2014

Related U.S. Application Data

(60) Provisional application No. 61/732,799, filed on Dec. 3, 2012.

(51) Int. Cl.
*G01P 21/00* (2006.01)
*G01C 25/00* (2006.01)

(52) U.S. Cl.
CPC .............. *G01P 21/00* (2013.01); *G01C 25/00* (2013.01)

(58) Field of Classification Search
None
See application file for complete search history.

(56) References Cited

U.S. PATENT DOCUMENTS

| | | | |
|---|---|---|---|
| 8,285,381 | B2 | 10/2012 | Fahey |
| 9,014,797 | B2 | 4/2015 | Shiffman et al. |
| 2005/0272496 | A1 | 12/2005 | Reinish et al. |
| 2009/0133499 | A1 | 5/2009 | Cato |
| 2010/0020073 | A1 | 1/2010 | Corazza et al. |
| 2010/0095773 | A1* | 4/2010 | Shaw .................... G06F 3/0346 73/514.31 |
| 2010/0167686 | A1 | 7/2010 | Pan |
| 2010/0268080 | A1 | 10/2010 | Kirn |
| 2011/0196262 | A1 | 8/2011 | McLeod et al. |
| 2011/0221664 | A1 | 9/2011 | Chen et al. |
| 2013/0266290 | A1 | 10/2013 | Sathish |
| 2015/0100251 | A1 | 4/2015 | Solinsky |
| 2015/0375085 | A1 | 12/2015 | Molyneux et al. |

\* cited by examiner

*Primary Examiner* — Paul West
*Assistant Examiner* — Mark A Shabman
(74) *Attorney, Agent, or Firm* — Squire Patton Boggs (US) LLP

(57) ABSTRACT

Inertial measurement units attached to a non-rigid body may measure a common motion event when the body changes direction of travel. Acceleration measurements made by the inertial measurement units of the event are used to determine a common reference direction which in turn can be used to derive, individually for each inertial measurement unit, a new orientation intended to be a better representation of the actual orientation of the inertial measurement unit.

20 Claims, 11 Drawing Sheets

SYSTEM AND METHOD FOR CALIBRATING INERTIAL MEASUREMENT UNITS

CROSS-REFERENCE TO RELATED APPLICATION

This application claims the benefit of U.S. Provisional Application No. 61/732,799, filed Dec. 3, 2012, which is incorporated herein by reference in its entirety and for all purposes.

FIELD OF THE INVENTION

The invention relates, in general, to inertial measurement units more particularly to calibration of inertial measurement units.

BACKGROUND OF THE INVENTION

An inertial measurement unit (IMU) can be placed on a body to capture motion of the body. Multiple IMUs can be placed at different points on a hinged body in an effort to detect motion at different parts of the body. One example of a hinged body is the body of a person. However, IMUs can have difficulty in keeping track of absolute orientation over a long period of time due to limits on their the ability to accurately detect some types of motion. The present orientation being used by an IMU may drift over time so that the present orientation being used no longer accurately corresponds to the true or absolute orientation of the IMU. Furthermore, the drift which occurs in one IMU will differ from that which occurs in another IMU. Variations in drift will prevent an accurate assessment of motion of one part of the body relative to another part of the body. For example, variations in drift may cause IMUs on two different parts of a person's body to indicate that the two parts of the body are moving in different directions when they are actually moving in the same direction.

Accordingly, when multiple IMUs are being used on the same body, there is a need to make corrections to the present orientation being used by each IMU to allow for an accurate determination of relative motion among the different parts of the body on which the IMUs are placed. There is a further need to make the corrections without the use of additional sensors and without a modification of the environment in which the IMUs operate.

SUMMARY OF THE INVENTION

Briefly and in general terms, the present invention is directed to a method, system, and computer readable medium for calibrating sensor modules.

In aspects of the present invention, a method comprises obtaining, from each of a plurality of sensor modules attached to a body, a direction measurement of an acceleration event occurring where the sensor module is located on the body, each direction measurement being derived from a present orientation of the sensor module and data on the acceleration event in the sensor module. The method further comprises determining a common reference direction, the common reference direction determined from at least one of the direction measurements. The method further comprises determining, for at least one of the sensor modules, a new present orientation in which the sensor module would have provided a direction measurement, of the acceleration event occurring where the sensor module is located, that is equivalent to the common reference direction.

In aspects of the present invention, a system comprises a plurality of sensor modules, and a processor communicatively coupled to each of the sensor modules. The processor is configured to obtain, from each of the plurality of sensor modules, a direction measurement of an acceleration event occurring where the sensor module is located, each direction measurement having been derived from a present orientation of the sensor module and data on the acceleration event in the sensor module. The processor is configured to determine a common reference direction from at least one of the direction measurements. The processor is configured to determine, for at least one of the sensor modules, a new present orientation in which the sensor module would have provided a direction measurement, of the acceleration event occurring where the sensor module is located, that is equivalent to the common reference direction.

In aspects of the present invention, a non-transitory computer readable medium has a stored computer program embodying instructions, which when executed by a computer, causes the computer to perform one or more steps for calibrating sensor modules. The computer readable medium comprises instructions for obtaining, from each of a plurality of sensor modules, a direction measurement of an acceleration event occurring where the sensor module is located, each direction measurement having been derived from a present orientation of the sensor module and data on the acceleration event in the sensor module. The computer readable medium further comprises instructions for determining a common reference direction from at least one of the direction measurements to determine. The computer readable medium further comprises instructions for determining, for at least one of the sensor modules, a new present orientation in which the sensor module would have provided a direction measurement, of the acceleration event occurring where the sensor module is located, that is equivalent to the common reference direction.

The features and advantages of the invention will be more readily understood from the following detailed description which should be read in conjunction with the accompanying drawings.

BRIEF DESCRIPTION OF THE DRAWINGS

The drawings are not necessarily to scale.

INCORPORATION BY REFERENCE

All publications and patent applications mentioned in the present specification are herein incorporated by reference to the same extent as if each individual publication or patent application was specifically and individually indicated to be incorporated by reference. To the extent there are any inconsistent usages of words and/or phrases between an incorporated publication or patent and the present specification, these words and/or phrases will have a meaning that is consistent with the manner in which they are used in the present specification.

DETAILED DESCRIPTION OF EXEMPLARY EMBODIMENTS

Figure 1:
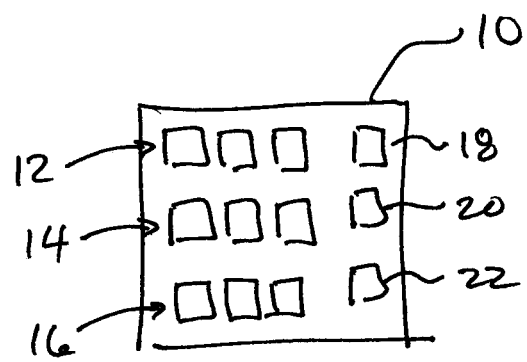
FIG. 1 is a block diagram of an exemplary inertial measurement unit.

Referring now in more detail to the exemplary drawings for purposes of illustrating exemplary embodiments of the invention, wherein like reference numerals designate corresponding or like elements among the several views, there is shown in FIG. 1 exemplary inertial measurement unit (IMU) 10 configured to provide information on its orientation, velocity, and acceleration. Inertial measurement unit 10 is an exemplary sensor module. Inertial measurement unit 10 uses a plurality of sensors that measure orientation and motion. The sensors include gyroscopes 12, accelerometers 14, and magnetometers 16. Gyroscopes 12 are configured to measure the rate and direction of rotation. Accelerometers 14 are configured to measure linear acceleration. Magnetometers 16 are configured to detect direction relative to magnetic north pole. Inertial measurement unit 10 may also include other electronic components, such as processor 18 and memory device 20 to receive, process, and store measurement data from gyroscopes 12, accelerometers 14, and magnetometers 16. Processor 18 may be a digital device that includes one or more semiconductor chips. Memory device 20 is configured for any one or a combination of volatile and non-volatile data storage. Inertial measurement unit 10 may also include communication device 22 for transmitting the data to an external device for evaluation and storage.

Accelerometers 14 measure the magnitude and the direction of an acceleration event and provide data indicating the magnitude and the direction of the acceleration event. In some embodiments, each accelerometer 14 can include multiple sensing elements. Each sensing element provides a measurement of acceleration in a particular direction. The sensing elements can be configured to measure a different directional component of a given acceleration event, which enables inertial measurement unit 10 to measure acceleration along three axes and then resolve the three measurements to provide an indication of the direction of the acceleration.

In some embodiments, each accelerometer 14 of a particular inertial measurement unit is configured to measure a different directional component of a given acceleration event. The directional components from each of the accelerometers are resolved or combined to provide an indication of the direction of the acceleration.

Figure 2:
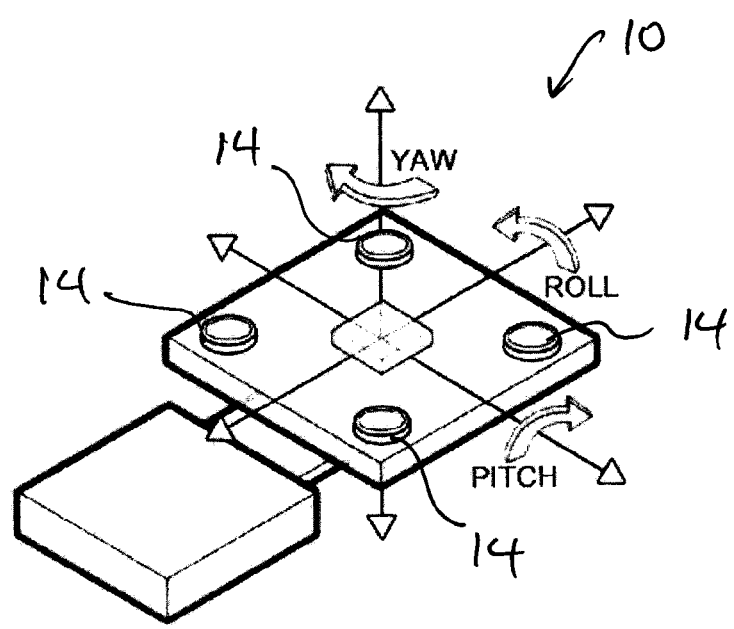
FIG. 2 is a perspective diagram of an exemplary inertial measurement unit showing orthogonal pitch, roll, and yaw axes.

One of the keys to inertial measurement is to determine orientation. Orientation can be determined from yaw, pitch, and roll, which are terms often used for aircraft. As used herein, yaw refers to orientation or rotation relative to an axis parallel to the background force of gravity (also referred to herein as the vertical axis), pitch refers to orientation or rotation relative to the lateral axis perpendicular to the background force of gravity, and roll refers to orientation or rotation relative to the longitudinal axis perpendicular to the background force of gravity. The vertical, lateral, and longitudinal axes are mutually perpendicular, as shown in FIG. 2.

Yaw, pitch, and roll are one exemplary way to represent orientation in space. The present invention may implement other representations of orientation. Examples of other representations of orientation include without limitation Euler Angles other than yaw, pitch, and roll, Trait-Bryan Angles or unit Quaternions.

Figure 11:
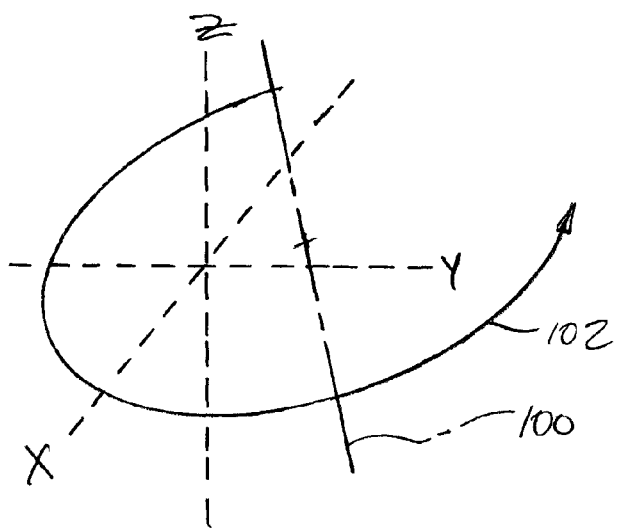
FIG. 11 is a conceptual diagram of a sensor module in three-dimensional space, showing angular acceleration and pivot axis of rotation of the angular acceleration.

Gyroscopes 12 can provide very good measurements of the rate of rotation. However, gyroscopes 12 can have problems accurately keeping track of absolute orientation over time, which results in what is referred to herein as gyroscopic drift. Gyroscopes can also observe angular acceleration. Similar to how multiple acceleration measurements from different axes can be combined to determine the direction of linear acceleration, multiple gyroscope measurements from different axes can be combined to determine the pivot of an angular acceleration. As used herein, the term "pivot" refers to the pivot axis 100 of rotation of an angular acceleration 102, as shown in FIG. 11.

Accelerometers 14 are configured to detect the background force of gravity, and the force of gravity can be used to accurately determine what direction is down. Inertial measurement unit 10 can use information on what direction is down to make corrections for gyroscopic drift with respect to pitch and roll rotation but not with respect to yaw rotation.

Magnetometers 16 are configured to detect the earth's magnetic north pole (magnetic north) and thereby determine direction relative to magnetic north. Inertial measurement unit 10 can use information on direction relative to magnetic north to make corrections to gyroscopic drift with respect to yaw rotation.

Inertial measurement unit 10 can be manufactured to be very small using advances in microelectromechanical systems (MEMS). Such advances need not be described herein as they are known by persons skilled in the art. For example, many smart phones may now include miniature sensors, such as gyroscopes, accelerometers, and magnetometers, which are capable of providing the functions of an inertial measurement unit. See, for example, U.S. Patent Application Publication Nos. 2011/0221664 (entitled "View Navigation on Mobile Device"), 2010/0167686 (entitled "Method of Power Management for a Handheld Mobile Computing Communication Device"), and 2009/0133499 (entitled "Accelerometer Module for Use with a Touch Sensitive Device").

With miniaturization, it is possible to place multiple inertial measurement units 10 on different parts of a body in order to capture the motion of the body. In the case of a human body, multiple inertial measurement units 10 can be used to analyze the biomechanics of motion for a variety of purposes, including without limitation athletic training, physical rehabilitation, physical therapy, and recreation. In many instances, it is important that individual inertial measurement units 10 be very accurate relative to each other, and it may be less important for individual inertial measurement units 10 to be accurate in absolute orientation and position relative to the surrounding environment. For example, it may be important that inertial measurement units placed on a person's ankle and knee be accurate in providing information about the motion of the ankle relative to the knee, and it may be less important for the inertial measurement units to provide accurate information about whether the ankle and knee are truly moving in a particular direction relative to magnetic north or other external environment reference.

As indicated above, inertial measurement unit 10 can use information from magnetometers 16 to make corrections for gyroscopic drift in yaw. However, using only magnetometers 16 to make corrections for gyroscopic drift in yaw can be difficult. The accuracy of magnetometers 16 can be adversely affected by the surrounding environment. Ferrous metals, such as steel, can cause a local distortion of the earth's magnetic field. Also, electronic devices can produce electromagnetic forces that interfere with and distort the earth's magnetic field. Even in the absence of ferrous metals and electromagnetic interference, it is often difficult to detect the earth's magnetic field while a sensor is in motion.

The present invention uses accelerometers 14 to make corrections for gyroscopic drift in yaw. Such corrections are not affected by the presence of local distortions in the earth's magnetic field. Multiple inertial measurement units 10 placed on a single, hinged body can be expected to experience the same motion events. However, because the body is hinged, the body is not entirely rigid. Various parts of the body, and thus various inertial measurement units 10, can experience different acceleration during the same motion event. As explained below, a common reference direction can be obtained from information provided by multiple inertial measurement units 10, and the common reference direction can then be used to make corrections to mitigate gyroscopic drift. The method and means for correction do not require sensing devices other than inertial measurement units 10 placed on the body and do not require other sensors to be placed in the surrounding environment. As such, the correction can be determined using only information obtained from inertial measurement units 10. Also, the method and means for correction do not require any modification to the environment in which inertial measurement units 10 are operating. As such, the correction can be determined without use of a device placed in the surrounding environment away from the body for the purpose of providing a beacon or an artificial reference.

Figure 3:
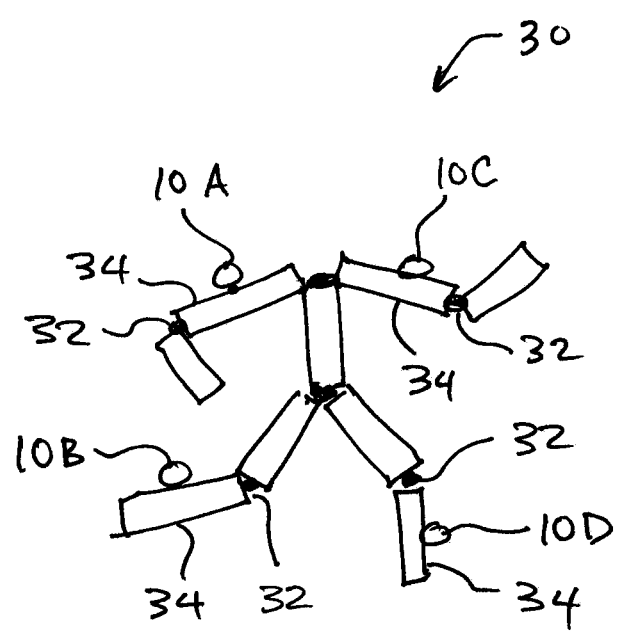
FIG. 3 is a diagram of an exemplary hinged body, showing a plurality of inertial measurement units attached to different body parts.

As shown in FIG. 3, multiple inertial measurement units 10 are connected to a single body 30 (an exemplary entity) capable of moving and changing direction. Body 30 is hinged at multiple points 32. Inertial measurement units 10 are located on different body parts 34. Body parts 34 are interconnected and can move relative to each other. One example of a hinged body is the body of a person in which joints, vertebrae, etc. function as hinges which allow relative movement between different parts of the anatomy.

When body 30 suddenly changes direction, such as when a person who is walking turns laterally to the right, body parts 30 together with inertial measurement units 10 may experience similar accelerations. All body parts 30 will ultimately change from traveling the original direction to traveling the new direction laterally to the right. Because body 30 is hinged and not entirely rigid, there may be variation in accelerations experienced and detected by inertial measurement units 10. For example, the acceleration measured by accelerometers 14 in inertial measurement unit 10A (such as on a person's arm) may differ from the acceleration measured by accelerometers 14 in inertial measurement unit 10B (such as on a person's leg).

When a set of inertial measurement units 10 detect a similar acceleration events (such as may occur in the example above in which a person turns laterally to the right or jumps forward), the detected direction of acceleration can be used as a reference for each member of the set of inertial measurement units 10 to calibrate the orientation of each member. For example, inertial measurement units 10A and 10B may detect similar acceleration events which are not similar to those detected by inertial measurement units 10C and 10D. The detected direction of acceleration can be used as a reference for inertial measurement units 10A and 10B to calibrate the orientation of inertial measurement units 10A and 10B only. Also, calibration is performed individually for each member (10A and 10B) of the set of inertial measurement units. For example, a correction to mitigate gyroscopic drift for inertial measurement unit 10A may differ from that for inertial measurement unit 10B. In addition, the calibration is performed relative to inertial measurement units 10 on body 30 and does not necessarily provide absolute orientation relative to the surrounding environment. This type of calibration allows for the accurate measurement of the position of inertial measurement units 10 relative to other inertial measurement units 10, which is useful for many types of motion analysis.

Figure 4:
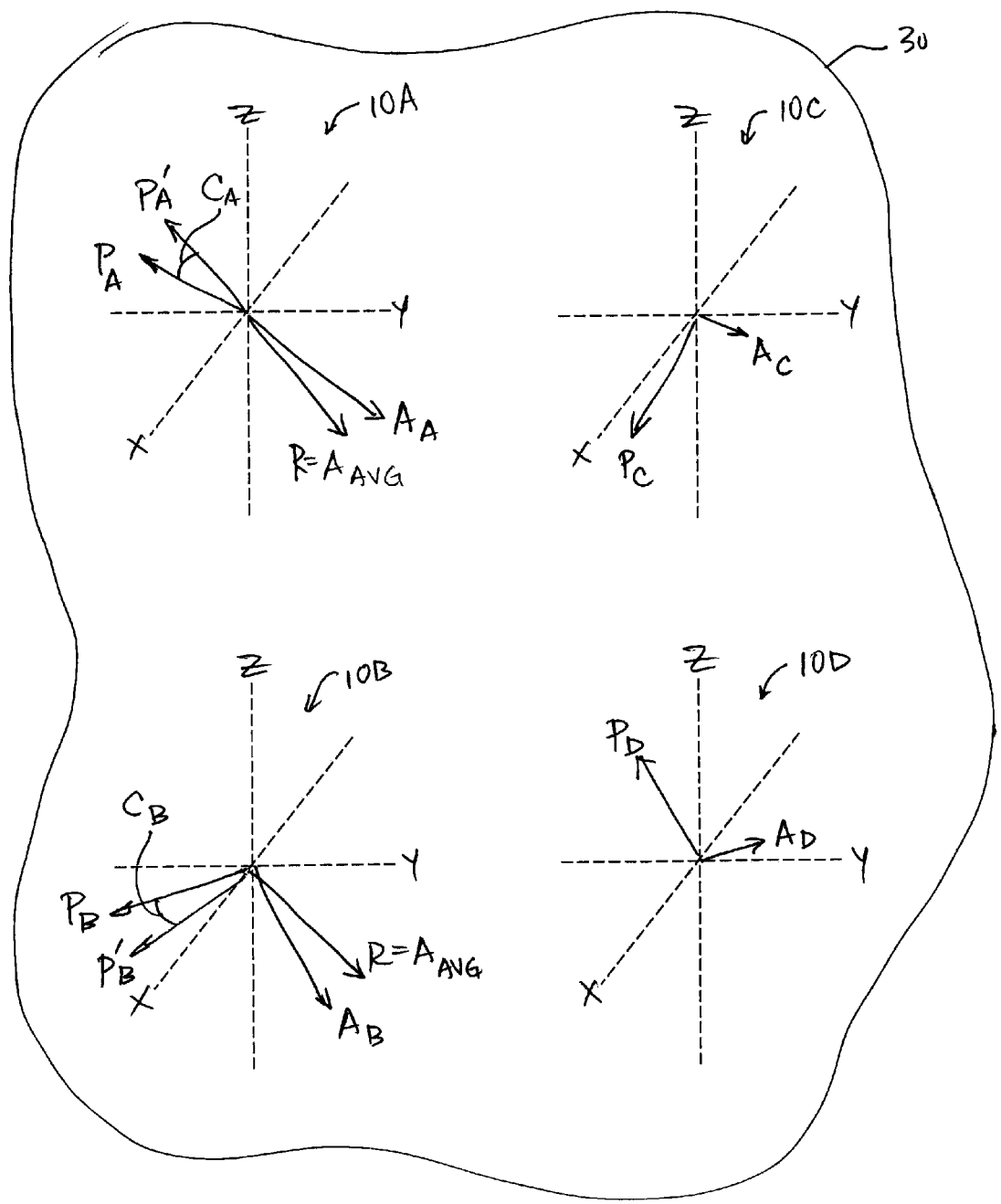
FIGS. 4 and 5 are conceptual diagrams of inertial measurement units in three-dimensional space, showing local acceleration (A) observed by each inertial measurement unit, a common reference direction (R), and present and new present orientations (P and P') of the inertial measurement units.

FIG. 4 represents each of inertial measurement units 10A, 10B, 10C, and 10D on body 30 in three-dimensional space with reference to a vertical axis (Z), lateral axis (Y), and longitudinal axis (X). Each of the inertial measurement units 10A-D has information on its present orientation, which is schematically represented by the letter P with a subscript letter corresponding to one of the inertial measurement units. When a motion event occurs on body 30, each of the inertial measurement units 10A-D detect magnitude and direction of local acceleration at its particular location on body 30. The local acceleration is schematically represented by the letter A with a subscript letter corresponding to one of the inertial measurement units. That is, $A_A$ represents the magnitude and direction of acceleration of the motion event as detected and measured by inertial measurement unit 10A using present orientation $P_A$, $A_B$ represents the magnitude and direction of acceleration of the motion event as detected and measured by inertial measurement unit 10B using present orientation $P_B$, and so on.

Measurement data for $A_A$, $A_B$, $A_C$, and $A_D$ are compared to determine whether any of the acceleration events $A_A$, $A_B$, $A_C$, and $A_D$ are sufficiently similar and are thus likely to correspond to a common motion event. For example, if FIG. 4 represents a human body, $A_A$ to $A_D$ can be measurements taken at or around the time when a person moves her right arm ($A_A$) and right leg ($A_B$) together while keeping her left arm ($A_C$) and left leg ($A_D$) relatively motionless. In this example, it is possible that only $A_A$ and $A_B$ are determined to correspond to a common motion event.

In foregoing example, linear accelerations $A_A$ and $A_B$ detected by accelerometers provide the basis for of the common motion event.

In other embodiments, angular accelerations detected by gyroscopes in the inertial measurements unit may provide the basis for a common motion event. The gyroscopes in multiple inertial measurement units on a hinged body would provide measurements of angular acceleration that, with sufficient similarly, can be deemed to correspond to a common motion event. A person waving her arm or swinging her leg are non-limiting examples of body movement that could create a common motion event corresponding to angular accelerations detected by the gyroscopes. Thus, multiple inertial measurement units may optionally observe a common motion event without using data on linear acceleration.

While the common reference direction for linear acceleration events is a direction vector, the common reference direction for an angular acceleration event would be the pivot axis of rotation. Where linear acceleration and the direction of that acceleration as detected by accelerometers are used in the exemplary systems and methods described herein, the linear acceleration and the direction of that acceleration can be replaced with an angular acceleration and the pivot of that rotation as detected by gyroscopes. In other words, the systems and methods herein can be modified to replace the linear acceleration with angular acceleration and replace the direction of linear acceleration with pivot of angular rotation in order to form further embodiments in accordance with the invention.

Referring again to FIG. 4, a set of inertial measurement units (i.e., two or more of inertial measurement units 10A to 10D) which detect a common motion event provide information about the direction of the detected acceleration. The information is used to compute an orientation correction for each inertial measurement unit of the set. In FIG. 4, the orientation correction is schematically represented by the letter C with a subscript letter corresponding to one of the inertial measurement units. Calibration includes applying the orientation correction to the present orientation to produce a new present orientation. In FIG. 4, the new present orientation is schematically represented by P' with a subscript letter corresponding to one of the inertial measurement units. The new present orientations P' replace the prior present orientations P and are then used by the inertial measurement units to provide information about motion events until the inertial measurement units are calibrated again.

In FIG. 4 for example, when only inertial measurement units 10A and 10B have been determined to have detected a common motion event, only the information provided by inertial measurement units 10A and 10B are used to compute orientation corrections $C_A$ and $C_B$. Calibration includes applying orientation correction $C_A$ to produce new present orientation $P'_A$ for inertial measurement units 10A, and applying orientation correction $C_B$ to produce new present orientation $P'_B$ for inertial measurement unit 10B. No orientation correction is computed for or applied to inertial measurement units 10C and 10D because a common motion event was detected only by inertial measurement units 10A and 10B.

In another motion event experienced by body 30, it is possible that a common motion event is detected by all inertial measurements on body 30. In such a case, orientation correction would be computed for and applied to all the inertial measurement units.

The orientation corrections provide orientations that an inertial measurement unit would have had to be in to detect the acceleration event consistent with another inertial measurement unit. In FIG. 4, orientation correction $C_A$ provides orientation $P'_A$ that inertial measurement unit 10A would have had to be in to detect the acceleration event consistent with inertial measurement unit 10B. Orientation correction $C_B$ provides orientation $P'_B$ that inertial measurement unit 10B would have had to be in to detect the acceleration event consistent with inertial measurement unit 10A. In other words, if inertial measurement units 10A and 10B had orientations $P'_A$ and $P'_A$, respectively, inertial measurement units 10A and 10B would provide identical acceleration direction measurement data of the acceleration events occurring at the respective locations.

Computing orientation corrections that allow inertial measurement units to be consistent or in agreement with each other can be performed by determining a common reference direction, which is schematically represented by the letter R in the figures. Common reference direction R is used to the compute orientation corrections. Common reference direction R is the same for inertial measurement units 10A and 10B that are being calibrated. Common reference direction R can be determined using one or more heuristic processes.

In an exemplary heuristic processes, common reference direction R is computed as an average direction $A_{AVG}$ of acceleration directions measured by various inertial measurement units. Reference direction R need not correspond to the absolute direction of the detected acceleration relative to magnetic north or other external environment reference. In FIG. 4 for example, $A_{AVG}$ can be computed as the average of $A_A$ and $A_B$, then orientation corrections $C_A$ and $C_B$ can be computed such that they provide new orientations $P'_A$ and $P'_B$ which replace $P_A$ and $P_B$. The corrections are based on common reference direction R (which is $A_{AVG}$ in this example) in the following sense: new orientations $P'_A$ and $P'_B$ are the orientations in which inertial measurement units 10A and 10B would have had to be in to detect an acceleration having a direction equivalent to average direction $A_{AVG}$. In other words, if inertial measurement units 10A and 10B had orientations $P'_A$ and $P'_A$, respectively, the direction measurement by inertial measurement units 10A and 10B would each be equivalent to average direction $A_{AVG}$.

In the above example, no correction is made to orientations $P_C$ and $P_D$ of inertial measurement units 10C and 10D because units 10C and 10D did not detect a common motion event with inertial measurement units 10A and 10B. It should be understood that for a subsequent motion event experienced by body 30, it is possible for all or any combination of inertial measurement units 10A to 10D to detect a common motion event.

Figure 5:
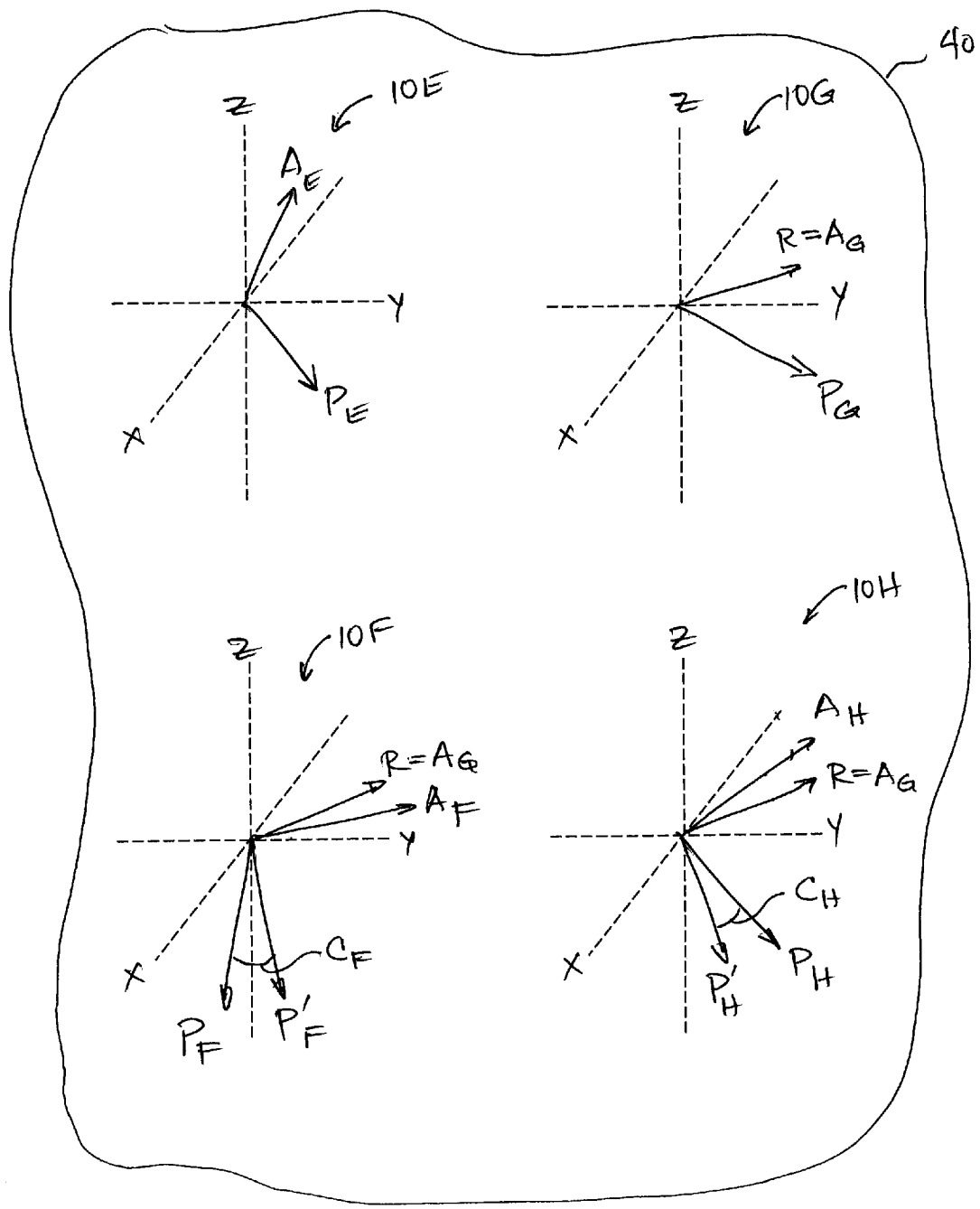

In another exemplary heuristic process, common reference direction R is computed in a manner that gives greater precedence to one or a group of inertial measurement units over other inertial measurement units. For example, the inertial measurement unit with the highest precedence keeps its present orientation, and the orientation of each of the other inertial measurement units is corrected to be consistent with the inertial measurement unit with the highest precedence. In FIG. 5, inertial measurement units 10E-H are all attached to hinged body 40. Inertial measurement units 10E-H are given a predefined order of precedence in which inertial measurement unit 10G has the highest precedence.

At or around the time of a motion event experienced by body 40, inertial measurement units 10E-H detect local accelerations $A_E$ to $A_H$. The magnitude and direction of the accelerations are measured. Each acceleration direction is measured in relation to the present orientation of an individual inertial measurement unit. For instance, acceleration direction of $A_H$ is measured in relation to present orientation $P_H$ of inertial measurement unit 10H. The measurements of magnitude and/or direction of $A_E$ to $A_H$ are compared. Based on the comparison, it is possible that only inertial measurement units 10F, 10G, and 10H are determined to have detected a common motion event due to sufficiently similarity among $A_F$, $A_G$, and $A_H$. Because inertial measurement unit 10G has the highest precedence, common reference direction R is taken to be the direction of $A_G$ as measured by the accelerometers in inertial measurement unit 10G. Directions R and $A_G$ need not correspond to the absolute direction of the detected acceleration relative to magnetic north or other external environment reference. Orientation corrections $C_F$ and $C_H$ are computed based on common reference direction R (which is $A_G$ in this example). Orientation corrections $C_F$, and $C_H$ provide new orientations $P'_F$ and $P'_H$ which replace prior orientations $P_F$ and $P_H$. New orientations $P'_F$ and $P'_H$ are the orientations in which inertial measurement units 10F and 10H would have had to be in to provide the same measurement of acceleration direction as inertial measurement units 10G. New orientations $P'_F$ and $P'_H$ are the orientations in which inertial measurement units 10F and 10H would have had to be in to provide direction measurements, of the acceleration events occurring at their respective locations, that is equivalent to the direction of common reference direction R (which is $A_G$ in this example). No orientation correction is computed or applied inertial measurement unit 10E since it did not detect a common acceleration event with the other inertial measurement units.

It will be appreciated that other heuristic process can be used to compute a common reference direction R. For example, common reference direction R can be computed as the average of all inertial measurement units except the one with the lowest precedence. As a further example, common reference direction R can be computed from weighted averages of acceleration direction measurements where different weights are given to the inertial measurement units. The given weight can be based on a predefined order of precedence of the inertial measurement units. It will be appreciated that one type of heuristic process can be applied to one group of inertial measurement units and another type of heuristic process can be applied to another group of inertial measurement units on the same body. Selection and use of any particular heuristic process can depend on any one of a combination of factors including without limitation: the type of body which is being analyzed (e.g., it is a human, animal, machine, or other artificial structure); the type of motion or physical activity to be analyzed; and the location of the inertial measurement units on the body.

In the above descriptions, common reference direction R is derived from measurements performed by accelerometers in the inertial measurement units. The orientation corrections are based at least in part on common reference direction R. The orientation corrections include corrections in any of roll, pitch, and yaw. That is, each orientation correction may include any of an amount of roll rotation, an amount of pitch rotation, and an amount of yaw rotation.

In some embodiments, corrections in roll, pitch, and yaw can all be based on common reference direction R. In each orientation correction C, the amount of roll rotation, the amount of pitch rotation, and the amount of yaw rotation are derived from data from an accelerometer in the inertial measurement unit. Referring to FIG. 5 for example, differences between $A_H$ and R in terms of roll, pitch, and yaw can be used to compute corrections in roll, pitch, and yaw, which collectively result in orientation correction $C_H$.

Alternatively, the roll and pitch corrections can be based on measurements made by the background observation of gravity as observed over longer periods of time by accelerometers in the inertial measurement units and not based on common reference direction R, and only the yaw correction is based on common reference direction R as observed by accelerometers over a relatively short period of time. In foregoing context, the phrase "relatively short period" of time is a time period that is shorter relative to the "longer period of time" used for the background observation of gravity. The phrase "relatively short period" may correspond to a time period at or near a particular motion event. The phrase "longer periods of time may correspond to a time period that encompasses the particular motion event and possibly other motion events experienced by the body. The phrase "longer periods of time" may correspond to a time duration that encompasses at least tens of seconds, at least a minute, at least several minutes, or at least tens of minutes.

In each orientation correction C, the amount of roll rotation and the amount of pitch rotation are derived from data from a background observation of gravity in the inertial measurement unit, and the amount of yaw rotation is derived from data from an accelerometer in the inertial measurement unit detecting an acceleration event. Referring to FIG. 5 for example, the difference between $A_H$ and R in terms of yaw can be used to compute the correction in yaw, and measurement data from the background observation of gravity can be used to compute the corrections in roll and pitch. The magnetometer in the inertial measurement unit may or may not also be used for determining correction in yaw depending on the implementation and how reliably the earth's magnetic field can be observed in the environment.

Figure 6A:
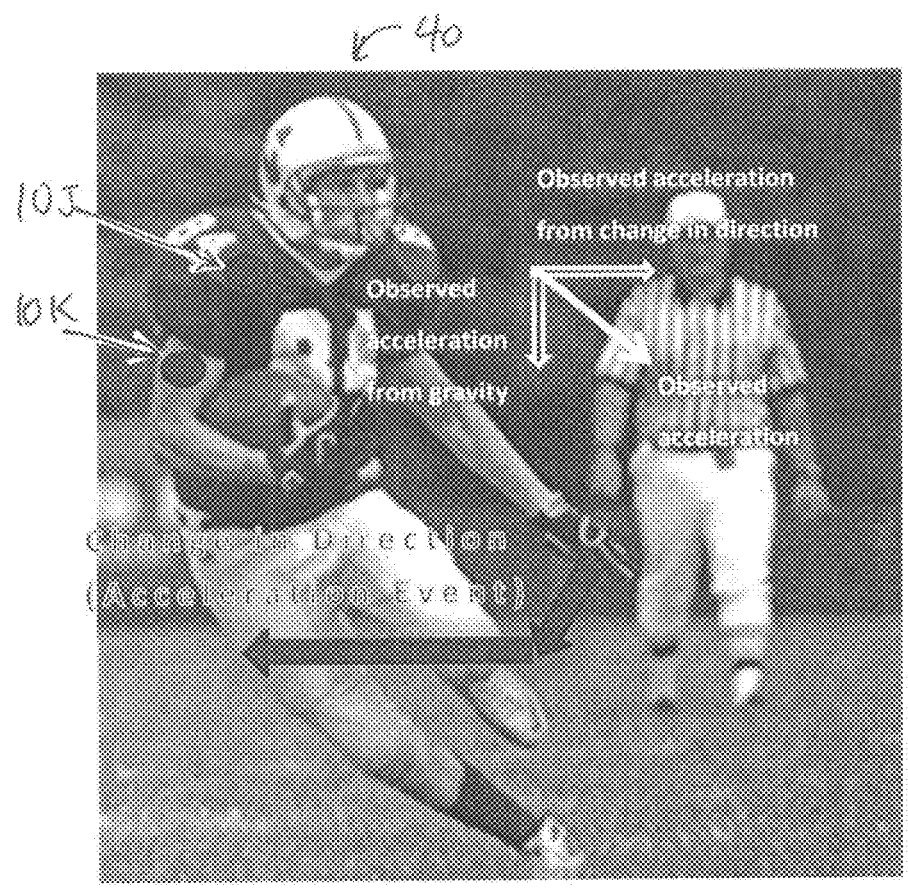
FIG. 6A is a diagram of an athlete in motion, showing inertial measurement units attached to the athlete.
Figure 6B:
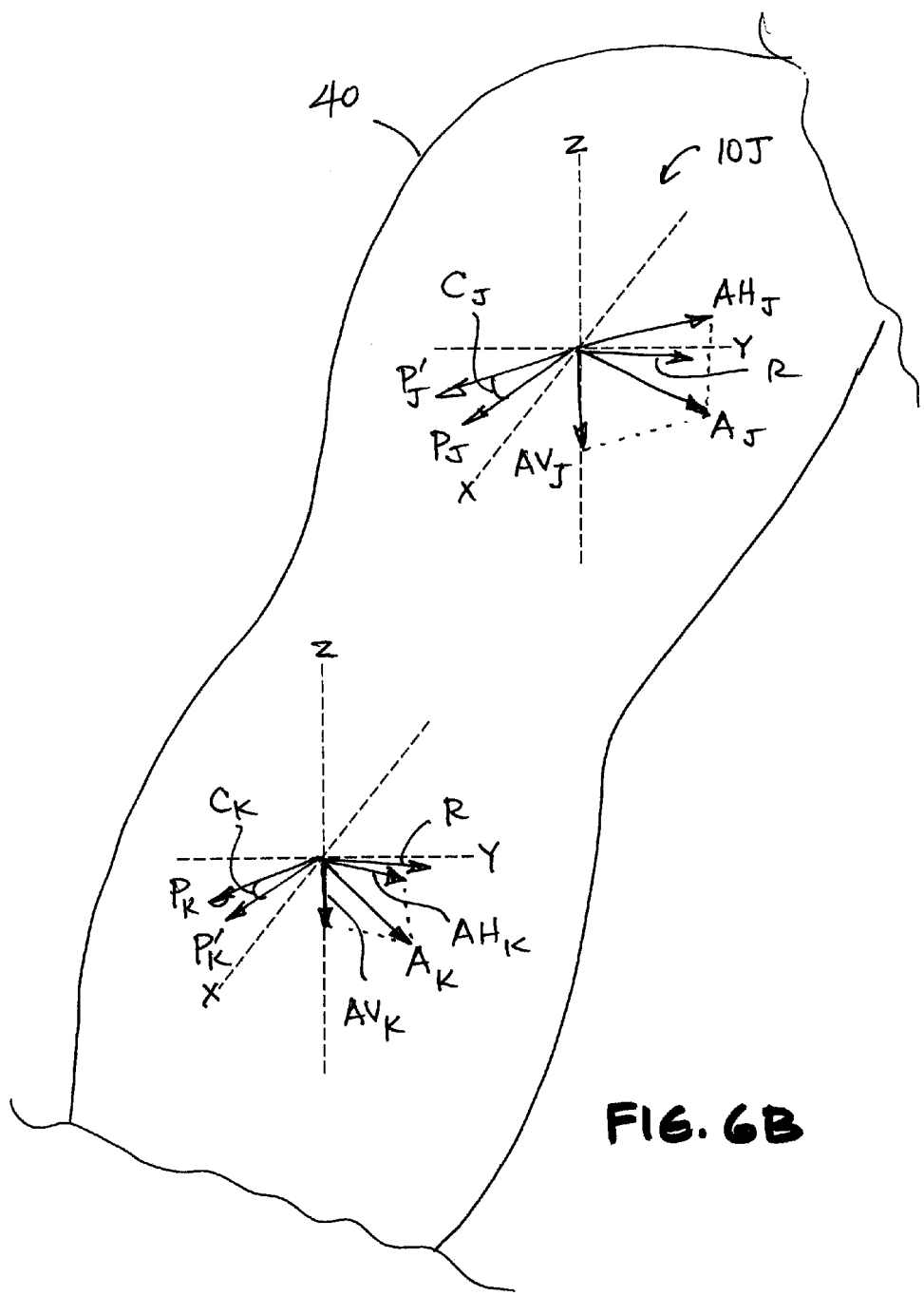
FIG. 6B is a conceptual diagram of the inertial measurement units of FIG. 6A in three-dimensional space, showing horizontal and vertical components (AH and AV) of local acceleration (A) observed by each inertial measurement unit.

FIGS. 6A and 6B show an exemplary acceleration event in which an athlete changes direction of travel. Athlete 40 is a hinge body on which inertial measurement units 10J and 10K are attached. Each of inertial measurement units 10J and 10K observe acceleration $A_J$ and $A_K$, respectively, at or around the time of the change of travel direction. Each of accelerations $A_J$ and $A_K$ has an acceleration component AH perpendicular to the background force of gravity and an acceleration component AV parallel to the background force of gravity.

In any of the embodiments described herein (such as the embodiments described in connection with FIGS. 4 and 5), it is possible to use only the measured acceleration component perpendicular to the force of gravity to compute the orientation correction. In which case, the acceleration component parallel to the force of gravity is not used to compute the orientation correction. In FIG. 6B for example, $AH_J$ is the acceleration component perpendicular to gravity of $A_J$, and $AH_K$ is the acceleration component perpendicular to gravity of $A_K$. $AH_J$ and $AH_K$ are on the X-Y plane. Common reference direction R is computed in a heuristic process involving $AH_J$ and/or $AH_K$ (for example, the average of components $AH_J$ and $AH_K$) with $AV_J$ and $AV_K$ being absent. That is, components $AV_J$ and $AV_K$ are not used to compute common reference direction R. The orientation correction in yaw contained in $C_J$ is the difference in yaw between R and $P_J$. The orientation correction in yaw contained in $C_K$ is the difference in yaw between R and $P_K$. The orientation corrections in roll and pitch contained in $C_J$ and $C_K$ are based on the observation of gravity in inertial measurement units 10J and 10K, respectively.

As described above, correction of gyroscopic drift includes comparing measurement data from inertial measurement units, determining whether the measurement data are sufficiently similar to conclude that local acceleration events correspond to a common motion event, computing common reference directions, and computing orientation corrections that are based on common reference directions and that provide new orientations for inertial measurement units. These steps can be performed by various systems described below.

Figure 7:
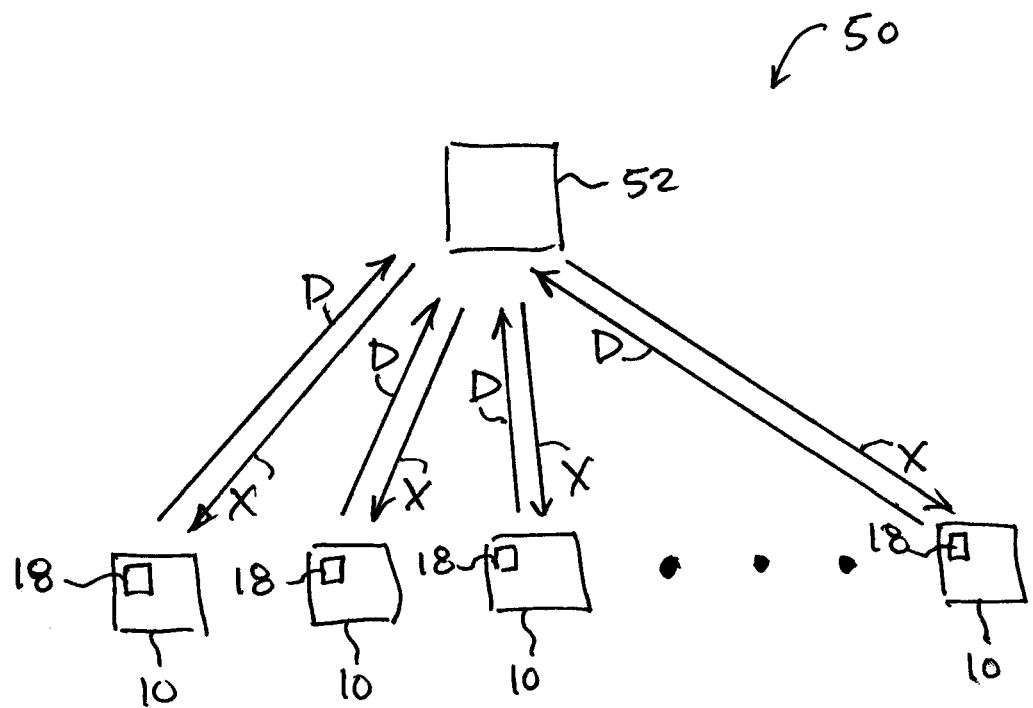
FIG. 7 is a block diagram of a system, showing inertial measurement units in two-way communication with a processor.

FIG. 7 shows exemplary system 50 which includes processor 52 configured to perform any one or a combination of steps described herein for calibration. Processor 52 can be part of a computer capable of executing, in accordance with a computer program stored on a non-transitory computer readable medium, any one or a combination of the steps described herein for calibration. The non-transitory computer readable medium may comprise any one or a combination of instructions for performing the steps described herein for calibration.

Processor 52 can include one or more electronic semiconductor chips. Processor 52 may also include one or more memory devices for any one or a combination of volatile and non-volatile data storage. Processor 52 can be located at a distance away from a body on which inertial measurement units 10 are to be connected. Processor 52 may also be attached to a body on which inertial measurement units 10 are to be connected. Processor 52 can be a personal computer, such as a laptop computer or a desktop computer. Processor 52 can be an embedded digital device. As an embedded digital device, processor 52 can be embedded within one or more of inertial measurement units 10. Processor 52 can be a mobile digital device, such as a smart phone or tablet.

Processor 52 is communicatively coupled to a plurality of inertial measurement units 10 capable of being attached to a hinged body. Processor 52 may be communicatively coupled to any number of inertial measurement units 10, although only four are illustrated for ease of illustration. Two-way communication between processor 52 and inertial measurement units 10 can be accomplish wirelessly and/or using wires. For example, communication between processor 52 and inertial measurement units 10 may be in the form of any one or a combination of electric signals through wires and electromagnetic signals through space.

Referring again to FIG. 7, inertial measurement units 10 transmit to processor 52 data D of measurements of acceleration direction and acceleration magnitude made by accelerometers in inertial measurement units 10. Measurement data D may also include data from gyroscopes and magnetometers in inertial measurement units 10. Processor 52 receives and compares measurement data D. Processor 52 determines, based on the comparison of measurement data D, whether any of inertial measurement units 10 have detected a common acceleration event. When processor 52 determines that a common acceleration event was detected by at least two inertial measurement units 10, processor 52 computes common reference direction R which is used to individually determine orientation correction C for each inertial measurement unit 10. For each inertial measurement unit 10, orientation correction C is applied to present orientation P to obtain new present orientation P'.

As shown in FIG. 7, processor 52 transmits correction information X to inertial measurement units 10 after receiving measurement data D. Correction information X enables replacement of present orientations P of inertial measurement units 10 with new present orientations P'.

In some embodiments, correction information X is information on common reference direction R which processor 18 in each inertial measurement unit 10 uses to individually determine orientation correction C for its inertial measurement unit 10. Then processor 18 applies orientation correction C to present orientation P to obtain new present orientation P'.

In some embodiments, processor 52 computes orientation correction C separately for each inertial measurement unit 10 and transmits orientation correction C as correction information X. Processor 18 in each inertial measurement unit 10 applies orientation correction C to present orientation P to obtain new present orientation P'.

In some embodiments, processor 52 receives data D that includes present orientation P of each inertial measurement unit 10. Processor 52 computes orientation correction C separately for each inertial measurement unit 10, applies orientation correction C to present orientation P to obtain new present orientation P', and then transmit new present orientation P' as correction information X.

A processor, being a combination of processor 52 and individual processors 18 in one or more inertial measurement units 10, can be configured to perform any one or a combination of steps described herein for calibration.

An exemplary calibration method to correct gyroscopic drift will be described with reference to FIGS. 8, 9A and 9B. Although the method is described with reference to previously described devices, it will be appreciated that other devices or groups of devices may be used to perform the method.

Throughout or most of the calibration method, the present orientation of a sensor module is continuously determined using data from the sensor module, such as data from gyroscopes, accelerometers, and magnetometers in the sensor module. Calibration of the present orientation relative to other sensor modules may occur only once or periodically.

Figure 9A:
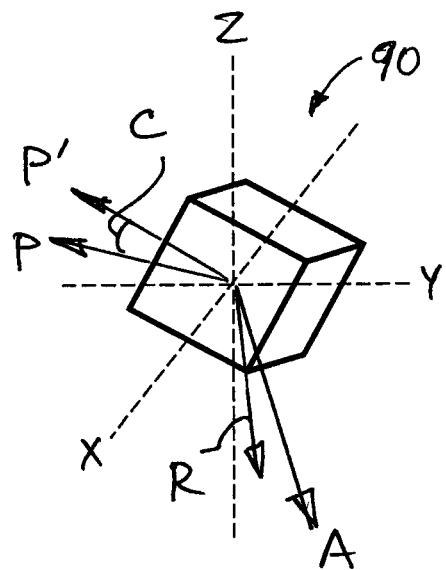
FIG. 9A is a conceptual diagram of a sensor module, showing coordinate axes (X, Y, and Z) of the surrounding environment and an acceleration event (A) in relation to the environment coordinate axes.

In FIG. 9A, present orientation P is the orientation of sensor module 90 in the surrounding environment having coordinate axes X, Y, and Z. The absolute orientation of sensor module 90 is its orientation relative to magnetic north or other external environment reference. Present orientation P is an approximation of and need not match the absolute orientation of sensor module 90. Sensor module 90 can be inertial measurement unit 10 previously described.

Figure 8:
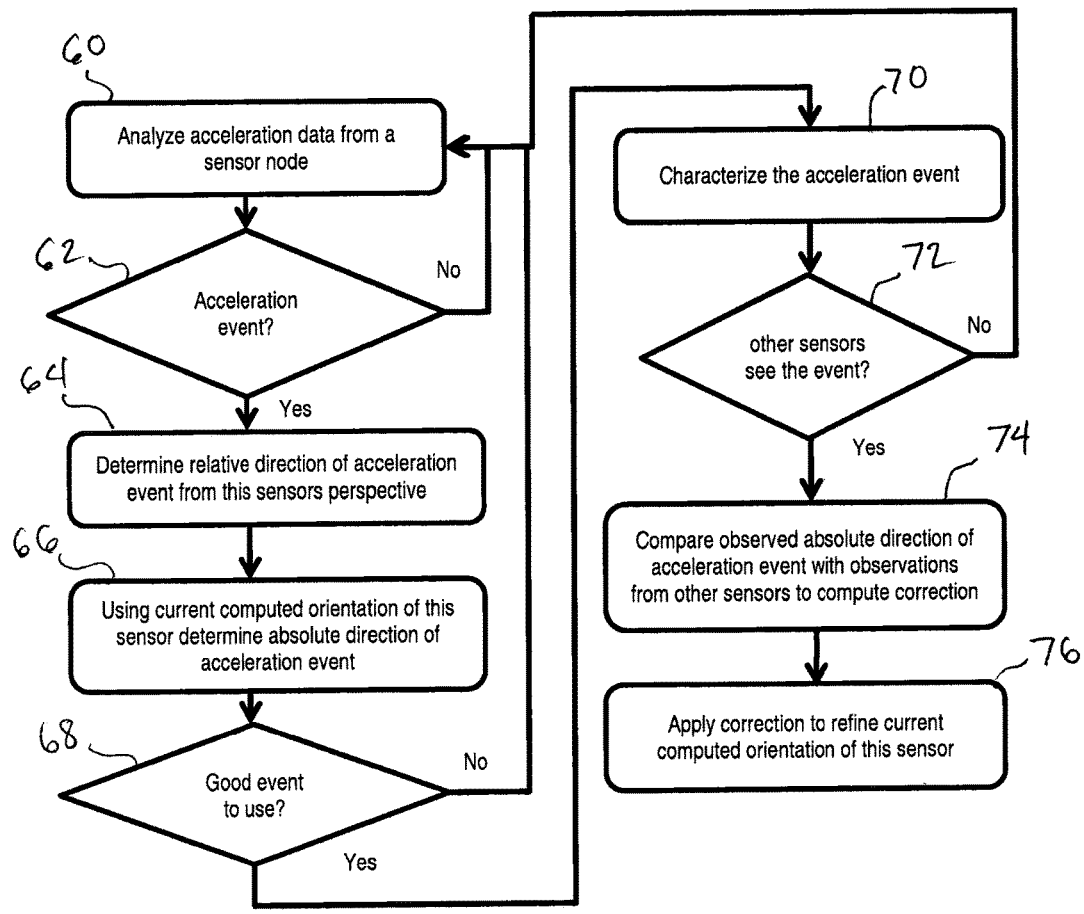
FIG. 8 is a flow diagram showing an exemplary calibration method to correct drift.

In block 60 of FIG. 8, acceleration data from sensor module 90 is analyzed to look for a distinct acceleration event. A set of data from sensor module 90 taken at or around a particular time is referred to as a reading. The analysis may include observing an individual reading or multiple readings over a period of time. A distinct acceleration event can be defined in terms of acceleration magnitude in a predefined range. For example, processor 52 can analyze the acceleration data and determine that a distinct acceleration event has occurred when the processor identifies an acceleration magnitude in one or more readings as being within the predefined range.

In block 62, the method proceeds to the next step when a distinct acceleration event is observed. If a distinct acceleration event has not been observed, block 60 may be repeated to analyze subsequent readings and search for another opportunity to calibrate and correct for drift.

In block 64, the direction of acceleration force A of the distinct acceleration event is determined from the perspective of sensor module 90. The direction from the perspective of sensor module 90 is designated $DIR_{LOCAL}$.

Figure 9B:
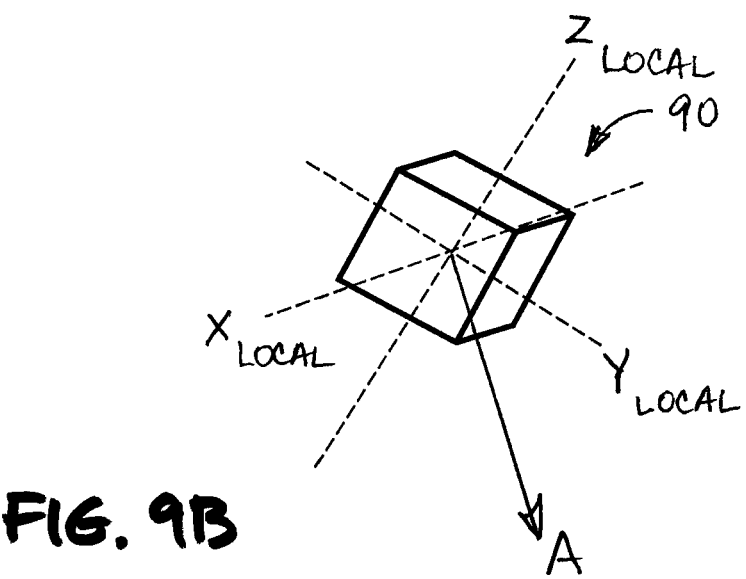
FIG. 9B is a conceptual diagram of the sensor module of FIG. 9A in the same orientation, showing local coordinate axes ($X_{LOCAL}$, $Y_{LOCAL}$, and $Z_{LOCAL}$) of the sensor module and the same acceleration event (A) in relation to the local coordinate axes.

For example, FIG. 9B show sensor module 90 of FIG. 9A except the local coordinate axes $X_{LOCAL}$, $Y_{LOCAL}$, and $Z_{LOCAL}$ are superimposed on sensor module 90 instead of environment coordinate axes X, Y, and Z. $X_{LOCAL}$, $Y_{LOCAL}$, and $Z_{LOCAL}$ define the local frame of reference internal to sensor module 90. Accelerometer sensor elements in sensor module 90 take measurements with respect to $X_{LOCAL}$, $Y_{LOCAL}$, and $Z_{LOCAL}$. The accelerometer sensor elements measure acceleration components of A along local axes $X_{LOCAL}$, $Y_{LOCAL}$, and $Z_{LOCAL}$, and then sensor module 90 (for example, a processor embedded in sensor module 90) resolves the acceleration components to determine $DIR_{LOCAL}$ with respect to local axes $X_{LOCAL}$, $Y_{LOCAL}$, and $Z_{LOCAL}$.

In block 66, an approximation of the absolute direction of acceleration force A is determined. The approximation of absolute direction, designated $DIR_{ABS}$, is the direction relative to coordinate axes X, Y, and Z (FIG. 9A) of the surrounding environment. In this context, $DIR_{ABS}$ is an approximation of and need not match the actual absolute direction of acceleration force A. $DIR_{ABS}$ is derived from present orientation P of the sensor module (considered to be an approximation of the absolute orientation of the sensor module) and accelerometer data that provide $DIR_{LOCAL}$. That is, P is used to translate $DIR_{LOCAL}$ to $DIR_{ABS}$.

In block 68, a determination is made on whether the distinct acceleration event will be used to correct gyroscopic drift in the sensor module. The determination is based on any one or a combination of $DIR_{ABS}$ (which is an exemplary direction measurement of the acceleration event made by an accelerometer or accelerometers in the sensor module), the magnitude of the acceleration, and other information from sensor module 90. Other information includes without limitation measurement data from gyroscopes and magnetometers. The determination can be performed by processor 52, for example.

The determination may include evaluating the extent to which $DIR_{ABS}$ differs from the vertical axis or axis parallel to the force of gravity. If the difference is sufficiently large, the distinct acceleration event will be used to correct gyroscopic drift. A predetermined threshold amount for the difference may be applied to determine whether the distinct acceleration event will be used to correct gyroscopic drift. Acceleration events that have acceleration directions which are too close to the direction of background force of gravity may be less helpful in correcting gyroscopic drift.

In addition or alternatively, the determination may include evaluating the magnitude of acceleration force A. For example, the acceleration magnitude component AH, which is perpendicular to vertical or perpendicular to the background force of gravity, is evaluated. If AH is sufficiently large, the distinct acceleration event will be used to correct gyroscopic drift. A predetermined threshold size for AH may be applied to determine whether the distinct acceleration event will be used to correct gyroscopic drift. Acceleration events having acceleration magnitude components AH that are too small may be less helpful in correcting gyroscopic drift.

In addition or as an alternative to any of the above, the determination may include evaluating the rotation that sensor module 90 is experiencing as measured by gyroscopes at the time of the distinct acceleration event. If the rate of rotation and/or a change in rotation rate is sufficiently low, the distinct acceleration event will be used to correct gyroscopic drift. Predetermined threshold values for the rate of rotation and change in the rate of rotation may be applied to determine whether the distinct acceleration event will be used to correct gyroscopic drift. Acceleration events that have an excessively high rate of rotation or an excessively sudden change in the rate of rotation may be less helpful in correcting gyroscopic drift.

The method proceeds to the next step when it is determined that the distinct acceleration event will be used to correct gyroscopic drift. If a negative determination is made, the method may proceed by going back to block 60 to search for another opportunity to calibrate and correct for drift.

In block 70, a rule is developed or obtained to determine whether distinct acceleration events from sensor module 90 and other sensor modules are sufficiently similar to characterize the acceleration events as likely to have been caused by a common (i.e., the same) motion event experienced by the body on which the sensor modules are mounted. The distinct acceleration events from multiple sensor modules are useful in calibrating the sensor modules relative to each other when the distinct acceleration events correspond to a common motion event.

The rule may be developed in response to acceleration measurement data provided the sensor modules. Alternatively, the rule may be developed in advance, before acceleration measurement data are provided by the sensor modules. The rule may be developed or received by processor 52, for example.

The rule may include one or more of the following factors that indicate whether the sensor modules are experiencing similar rotational characteristics as well as similar acceleration characteristics. Calibration will be more successful when two or more sensor modules are experiencing similar rotation as well as similar acceleration characteristics.

A factor in the rule can be the magnitude of acceleration at each of the sensor modules. The rule can require that acceleration magnitude seen by different sensor modules are within a predefined range. The predefined range can be an absolute predefined range which remains fixed. For example, a predefined absolute range can be bounded by fixed maximum and minimum values, and the rule may require two or more acceleration magnitudes to be within the maximum and minimum values. The range can be a predefined relative range. For example, a predefined relative range can shift in position depending on the size of the acceleration magnitudes, and the rule may require that two or more acceleration magnitudes be within a threshold amount from each other.

A factor in the rule can be the duration of the acceleration. The rule can require that two or more accelerations each have a duration that is within a threashold amount from each other.

A factor in the rule can be the abruptness of the acceleration. The rule can require that two or more accelerations each have a rate of change at the start of the acceleration event that is within a threshold amount of each other.

In block 72, the rule in block 70 is applied to search for similar acceleration events from two or more sensor modules that are useful. Applying the rule includes comparing distinct acceleration events from two or more sensor modules to determine whether the distinct acceleration events correspond to a single motion event experienced by the body on which the sensor modules are attached. The rule may be applied by processor 52, for example.

If it is determined that two or more distinct acceleration events correspond to a single motion event, the method proceeds to block 74. Otherwise, the method may proceed by returning to block 60 to search for another opportunity to calibrate and correct for drift.

In block 74, corrections are computed using the distinct acceleration events that correspond to a single motion event. The corrections are what will later be applied to calibrate and correct for drift. The distinct acceleration events can be used to obtain common reference direction R. Common reference direction R can be obtained from one or more heuristic processes described above. The corrections can be computed by processor 52, for example.

Correction C is computed for each of the sensor modules that detected the distinct acceleration events that correspond to a single motion event. Correction C is what will later be applied to present orientation P of a sensor module to obtain new orientation P' is obtained. New orientation P' is based on R in the following sense: P' is the orientation that the sensor module would have had to be in to provide an acceleration direction measurement, of the distinct acceleration event where the sensor module is located, that is equivalent to common reference direction R. The sensor modules may have differing corrections C.

In block 76, calibration is performed on each of the sensor modules that detected the distinct acceleration events that correspond to a common motion event. The calibration includes applying correction C to each of those sensor modules to obtain new orientation P'. The calibration may further include using other data available to those sensor modules, such as measurement data from accelerometers, gyroscopes and magnetometers of the sensor module.

From the foregoing descriptions, it will be appreciated that P' is intended to be a better representation of the actual orientation of the sensor module than prior orientation P. P' is a new best approximation of the actual orientation of the sensor module taking into account particular information from acceleration events observed by the sensor modules. New orientation P' also normalizes the orientation used by the sensor module, enabling the sensor module to be accurate with respect to other sensor modules which detected the common motion event.

After block 72, the method may proceed by returning to block 60 to search for an additional opportunity to calibrate and correct for drift. It will be appreciated that calibration based on a common reference direction as described herein can be performed any number of times during the course of receiving measurement data from multiple sensor modules attached to a moving body for the purpose of analyzing motion. Repeated calibration can help ensure the accuracy of the measurement data.

Figure 10:
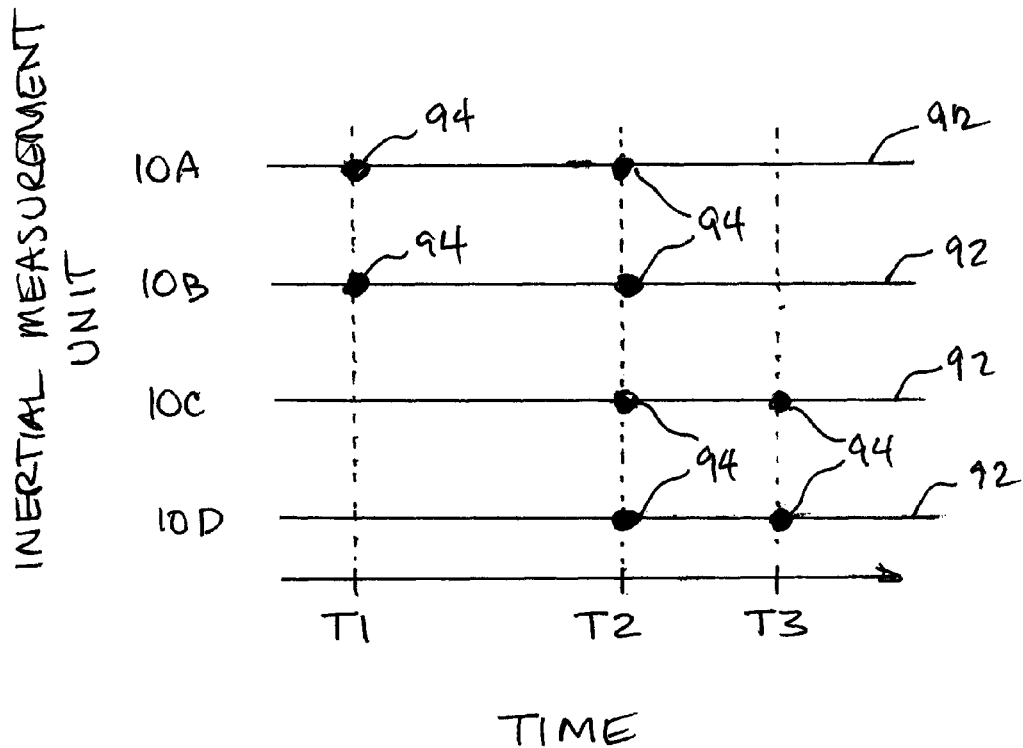
FIG. 10 is a time graph showing inertial measurement units, showing calibration being performed on different sets of the inertial measurement units at different times.

In FIG. 10, inertial measurement units 10A-10D attached to body 30 (FIG. 3) are continuously providing measurement data to a processor, such as processor 52 (FIG. 7), which may perform motion analysis using the measurement data and/or store the measurement data for later analysis. Inertial measurement units 10A-10D are exemplary sensor modules. The measurement data are being provided simultaneously, as schematically represented by parallel data streams 92. As body 30 moves with changing direction, a different set of inertial measurement units may be determined to detect a common motion event which results in calibration of the members of that set. Calibration is schematically represented by points 94. At time T1, only inertial measurement units 10A and 10B are determined to detect a common motion event and therefore only they are calibrated. At time T2, all inertial measurement units 10A-10D are determined to detect a common motion event and therefore all units 10A-10D are calibrated. At time T3, only inertial measurement units 10C and 10D are determined to detect a common motion event and therefore only they are calibrated.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for calibrating sensor modules, the method comprising:

obtaining, from each of a plurality of sensor modules attached to a body, a direction measurement of an acceleration event occurring where the sensor module is located on the body, there being a plurality of acceleration events each occurring at a different one of the sensor modules, the sensor modules movable relative to each other while attached to the body, the direction measurements being different from each other, each direction measurement being derived from a present orientation of the sensor module and data on the acceleration event from the sensor module; and using a processor to perform a process to correct orientation of one or more of the sensor modules, the process including:

determining a common reference direction, the common reference direction determined from at least one of the direction measurements, determining a first orientation correction for a first sensor module among the plurality of sensor modules, by comparing the common reference direction to the direction measurement obtained from the first sensor module, and applying the first orientation correction to the present orientation of the first sensor module to determine a new present orientation of the first sensor module.

2. The method claim 1, wherein the process performed by the processor further includes, before determining the common reference direction, determining that the acceleration events satisfy one or more requirements.

3. The method claim 2, wherein determining that the acceleration events satisfy one or more requirements includes determining that acceleration magnitudes of the acceleration events are within a range.

4. The method of claim 2, wherein determining that the acceleration events satisfy one or more requirements includes determining that acceleration magnitudes of the acceleration events are above a threshold size.

5. The method of claim 4, wherein the threshold size is a threshold size for an acceleration magnitude component perpendicular to background force of gravity.

6. The method of claim 2, wherein determining that the acceleration events satisfy one or more requirements includes:

determining a difference between an axis parallel to background force of gravity and an acceleration direction of the acceleration event at the first sensor module; and determining that the difference is greater than a threshold amount.

7. The method of claim 2, wherein determining that the acceleration events satisfy one or more requirements includes determining that rates or change in rates of rotation measured by the sensor modules are below a threshold value.

8. The method of claim 1, wherein the process performed by the processor further includes, before determining the common reference direction, determining that the acceleration events correspond to a single motion event occurring on the body.

9. The method of claim 8, wherein determining that the acceleration events correspond to a single motion event includes analyzing any one or a combination of acceleration magnitudes of the acceleration events, duration of the acceleration events, amount of rotation measured by the sensor modules during the acceleration events, and direction of rotation measured by the sensor modules during the acceleration events.

10. The method of claim 1, wherein determining the common reference direction includes averaging the direction measurements of two or more of the acceleration events.

11. The method of claim 1, wherein determining the common reference direction includes assigning the direction measurement of one of the acceleration events to be the common reference direction.

12. The method of claim 1, wherein the common reference direction is obtained from the direction measurements of at least two of the sensor modules.

13. The method of claim 12, wherein the process performed by the processor further includes:
determining a second orientation correction for a second sensor module among the plurality of sensor modules, by comparing the common reference direction to the direction measurement obtained from the second sensor module, and
applying the second orientation correction to the present orientation of the second sensor module to determine a new present orientation of the second sensor module.

14. The method of claim 1, wherein the first orientation correction for the first sensor module includes an amount of yaw rotation about an axis parallel to background force of gravity, and the amount of yaw rotation is derived from the data from the accelerometer in the first sensor module.

15. The method of claim 14, wherein the process performed by the processor further includes:
using the data on the acceleration event from the first sensor module to determine a first acceleration component of the acceleration event, the first acceleration component being perpendicular to the background force of gravity; and
using the first component to determine the amount of yaw rotation in the first orientation correction,
wherein the acceleration event at the first sensor module includes a second acceleration component parallel to the background force of gravity, and the second component is not used to determine the amount of yaw rotation in the first orientation correction.

16. The method of claim 1, wherein the first orientation correction for the first sensor module includes an amount of pitch rotation about an axis perpendicular to background force of gravity, and the amount of pitch rotation is derived from data from a magnetometer in the first sensor module.

17. The method of claim 1, wherein the first orientation correction for the first sensor module includes an amount of roll rotation about an axis perpendicular to background force of gravity, and the amount of roll rotation is derived from data from the magnetometer in the first sensor module.

18. The method of claim 1, wherein the acceleration events include linear acceleration events, the direction measurements include direction measurements of linear acceleration, and the common reference direction is determined from at least one of the direction measurements of linear acceleration.

19. The method of claim 1, wherein the acceleration events include angular acceleration events, the direction measurements include measurements of the pivots of rotation, the measurements of the pivots of rotation are different from each other, and the common reference direction is determined from at least one of the measurements of the pivots of rotation.

20. A non-transitory computer readable medium having a stored computer program embodying instructions, which when executed by a computer, causes the computer to perform one or more steps for calibrating sensor modules, the computer readable medium comprising:
instructions for obtaining, from each of a plurality of sensor modules attached to a body, a direction measurement of an acceleration event occurring where the sensor module is located on the body, there being a plurality of acceleration events each occurring at a different one of the sensor modules, the sensor modules movable relative to each other while attached to the body, the direction measurements being different from each other, each direction measurement having been derived from a present orientation of the sensor module and data on the acceleration event from the sensor module; and
instructions for a process to correct orientation of one or more of the sensor modules, the instructions for the process including:
instructions for determining a common reference direction from at least one of the direction measurements,
instructions for determining a first orientation correction for a first sensor module among the plurality of sensor modules, by comparing the common reference direction to the direction measurement obtained from the first sensor module, and
instructions for applying the first orientation correction to the present orientation of the first sensor module to determine a new present orientation of the first sensor module.

* * * * *